(12) United States Patent
Okubo

(10) Patent No.: US 7,116,217 B2
(45) Date of Patent: Oct. 3, 2006

(54) TRANSMITTER AND RECEIVER FOR TIRE CONDITION MONITORING APPARATUS

(75) Inventor: Youichi Okubo, Gifu-ken (JP)

(73) Assignee: Pacific Industrial Co., Ltd., Gifu-Ken (JP)

( * ) Notice: Subject to any disclaimer, the term of this patent is extended or adjusted under 35 U.S.C. 154(b) by 161 days.

(21) Appl. No.: 10/893,732

(22) Filed: Jul. 16, 2004

(65) Prior Publication Data
US 2005/0030169 A1 Feb. 10, 2005

(30) Foreign Application Priority Data
Jul. 24, 2003 (JP) ............... 2003-279278

(51) Int. Cl.
*B60C 23/00* (2006.01)
(52) U.S. Cl. ............ 340/445; 340/442; 340/446; 340/447; 340/448; 73/146.2
(58) Field of Classification Search ........ 340/442–448; 73/146–146.8
See application file for complete search history.

(56) References Cited

U.S. PATENT DOCUMENTS 4,048,614 A  9/1977 Shumway .......... 340/58
6,435,020 B1 * 8/2002 Oldenettel et al. ...... 73/146.4

FOREIGN PATENT DOCUMENTS

| DE | 32 42 291 | 5/1984 |
|----|-----------|--------|
| DE | 43 03 591 | 8/1994 |
| JP | 2001-174357 | 6/2001 |
| WO | WO 03/103992 | 12/2003 |

* cited by examiner

*Primary Examiner*—Daryl C Pope
(74) *Attorney, Agent, or Firm*—Fish & Richardson P.C.

(57) ABSTRACT

In an internal memory of a reception controller such as, for example, a ROM, a correction table is stored for correcting air pressure data. The reception controller receives a signal representing vehicle speed from a speedometer of the vehicle. The reception controller obtains a correction value from the correction table on the basis of the vehicle speed signal to add and deduct the correction value obtained and the air pressure data received. For this reason, the reception controller can obtain corrected air pressure data.

4 Claims, 3 Drawing Sheets

TRANSMITTER AND RECEIVER FOR TIRE CONDITION MONITORING APPARATUS

BACKGROUND OF THE INVENTION

The present invention relates to a transmitter and a receiver for a tire condition monitoring apparatus that permits a driver in a vehicle passenger compartment to check the conditions of tires, such as the air pressure.

Wireless tire condition monitoring apparatuses that allow a driver in a vehicle passenger compartment to check the conditions of vehicle tires have been proposed. For example, Japanese Laid-Open Patent Publication No. 2001-174357 discloses such an apparatus. The apparatus of the publication includes transmitters and a receiver. Each transmitter is located in the wheel of one of the tires and the receiver is located in the body frame of the vehicle. Each transmitter detects conditions, such as air pressure and the temperature of the associated tire, and wirelessly transmits the detected information. The receiver receives data wirelessly transmitted by the transmitters with an antenna and displays the conditions of the tires, for example, on a display located in front of the driver's seat.

The transmitter is constructed of electronic components such as a pressure sensor and a transmission antenna, and those electronic components are packaged on a substrate. The substrate on which electronic components have been packaged is housed within a casing. The casing has a valve stem for filling the tire with air. The valve stem is installed in an installation hole of the wheel. At this time, the casing is installed in a state in which it has abutted against a drop center in the wheel. Therefore, the normal direction to a diaphragm in a pressure sensor for measuring air pressure within the tire becomes the same as the direction of centrifugal force generated as the tire rotates (See Japanese Patent Laid-Open No. 2001-174357).

However, when the normal direction to the diaphragm in the pressure sensor is the same direction as the direction of centrifugal force that is generated as the tire rotates, an error may occur in the value of the air pressure measured by the pressure sensor. In other words, when vehicle speed is under a predetermined speed, the measured air pressure value is not affected by the centrifugal force that is generated as the tire rotates, but when the vehicle speed exceeds the predetermined speed, the centrifugal force that is generated as the tire rotates also becomes greater.

When more than a predetermined value of centrifugal force is applied to the diaphragm 32a of the pressure sensor 32, the diaphragm 32a of the pressure sensor 32 deflects inwardly or outwardly, as shown in FIGS. 5(a) and 5(b). Specifically, when the centrifugal force is applied to the pressure sensor 32 packaged on a lower surface of the substrate 80 from the outside of the diaphragm 32a toward the inside thereof as shown in FIG. 5(a), the diaphragm 32a deflects inwardly. As a result, the measured value is higher than the actual air pressure as shown in FIG. 5(c).

On the other hand, when the centrifugal force is applied to the pressure sensor 32 packaged on an upper surface of the substrate 80 from the inside of the diaphragm 32a toward the outside thereof as shown in FIG. 5(b), the diaphragm 32a deflects outwardly. As a result, the measured value is lower than the actual air pressure as shown in FIG. 5(c). Therefore, when the vehicle speed exceeds the predetermined speed, the centrifugal force that is generated as the tire rotates is applied to the diaphragm 32a of the pressure sensor 32, and a slight error occurs in the measured air pressure data.

The present invention has been achieved by focusing attention on such problems, and an object is to provide a transmitter and a receiver for a tire condition monitoring apparatus capable of reducing measurement error due to the centrifugal force that is generated as the tire rotates.

BRIEF SUMMARY OF THE INVENTION

To achieve the foregoing and other objectives and in accordance with the purpose of the present invention, a tire condition monitoring apparatus is provided. The apparatus comprises a transmitter provided in a tire of a vehicle and having a measuring device for measuring a condition of the tire. The transmitter wirelessly transmits data representing the condition of the tire measured by the measuring device. A centrifugal force detecting device detects magnitude of the centrifugal force that is generated as the tire rotates. A transmission correcting device corrects the data representing the condition of the tire measured by the measuring device on the basis of the magnitude of the centrifugal force obtained by detection with the centrifugal force detecting device.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus 1 according to an embodiment will now be described with reference to the drawings. The apparatus 1 is used in a vehicle such as an automobile.

Figure 1:
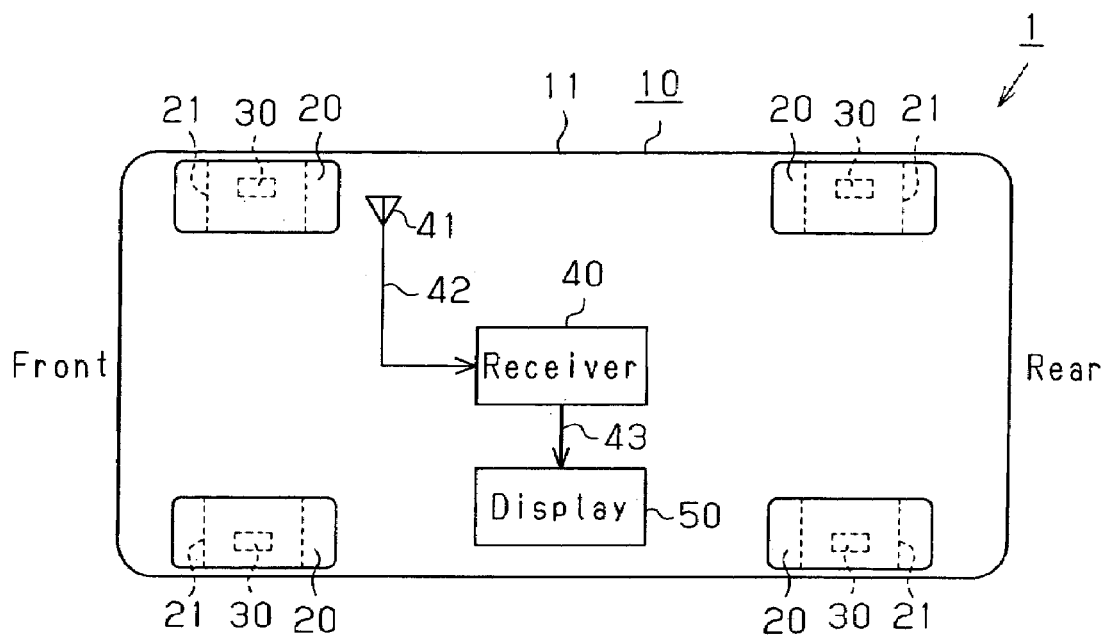
FIG. 1 is a block diagram showing a tire condition monitoring apparatus according to an embodiment of the present invention.

As shown in FIG. 1, the tire condition monitoring apparatus 1 includes the transmitters 30 and a receiver 40. The quantity of transmitters 30 is four. Each transmitter 30 is located in one of the tires 20 of a vehicle 10. The receiver 40 is located on a body frame 11 of the vehicle 10.

Each transmitter 30 is located in the corresponding tire 20 and is fixed, for example, to a wheel 21 of the tire 20. Each transmitter 30 measures the condition of the corresponding tire 20, that is, the pressure of the tire 20. The transmitter 30 then wirelessly transmits data containing air pressure data.

The receiver 40 is located at a predetermined position on the body frame 11 and is activated by electricity from a battery (not shown) of the vehicle 10. The receiver 40 is connected to a reception antenna 41 with a cable 42. The receiver 40 receives data transmitted by the transmitters 30 through the reception antenna 41.

A display 50 is located in view of the driver of the vehicle 10, for example, in the passenger compartment. The display 50 is connected to the receiver 40 with a cable 43.

Figure 2:
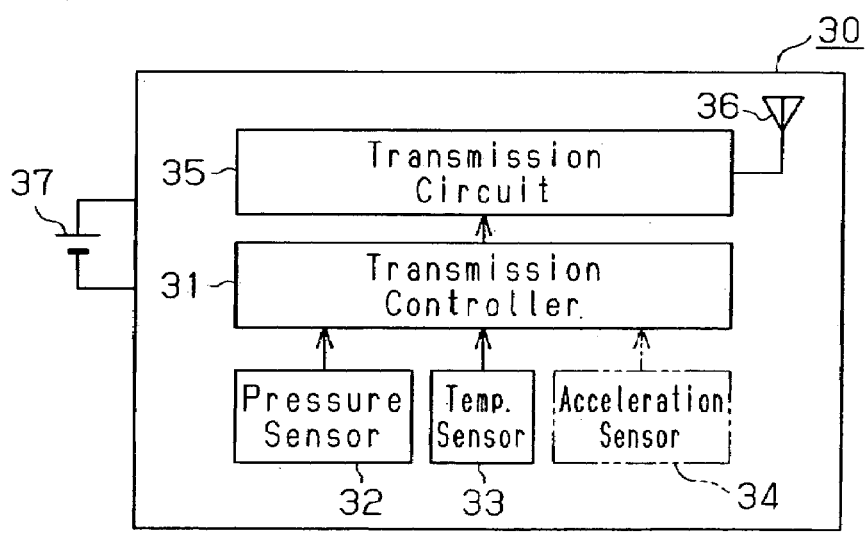
FIG. 2 is a block diagram showing one of the transmitters shown in FIG. 1.

With reference to FIG. 2, each transmitter 30 has a transmitter controller 31, which is, for example, a microcomputer. The controller 31 includes, for example, a central processing unit (CPU), a read only memory (ROM), and a random access memory (RAM). A unique ID code is registered in an internal memory, for example, the ROM, of the controller 31. The ID code is used to distinguish the associated transmitter 30 from the other three transmitters 30.

The tire pressure sensor 32 measures the air pressure in the interior of the associated tire 20 and provides the controller 31 with pressure data, which is obtained from the measurement. The temperature sensor 33 measures the temperature in the interior of the associated tire 20 and provides the transmission controller 31 with temperature data, which is obtained from the measurement.

Each transmission controller 31 sends the air pressure data, the temperature data, and the registered ID code to a transmission circuit 35. The transmission circuit 35 encodes and modulates the data sent from the transmission controller 31. The transmission circuit 35 then wirelessly sends the data to the receiver 40 through the antenna 36.

Each transmitter 30 is provided with a battery 37. The transmitter 30 is driven by electricity from the battery 37. The transmission controller 31 of each transmitter 30 controls the pressure sensor 32 and the temperature sensor 33 to perform measurement at predetermined time intervals (for example, every fifteen seconds). Also, the transmission controller 31 controls the transmission circuit 35 to perform periodic transmission every time the pressure sensor 32 completes a predetermined number of measurements (e.g., 40 cycles of measurements). Further, when detecting an abnormality in the pressure in the tire 20 or of the temperature in the tire 20, the controller 31 causes the transmission circuit 35 to perform transmission irrespective of timing of the periodic transmission.

The timing of transmission of the transmitters 30 is regulated such that each transmitter 30 performs transmission at a timing different from those of the other transmitters 30. Therefore, two or more of the transmitters 30 do not perform transmission simultaneously.

Figure 3:
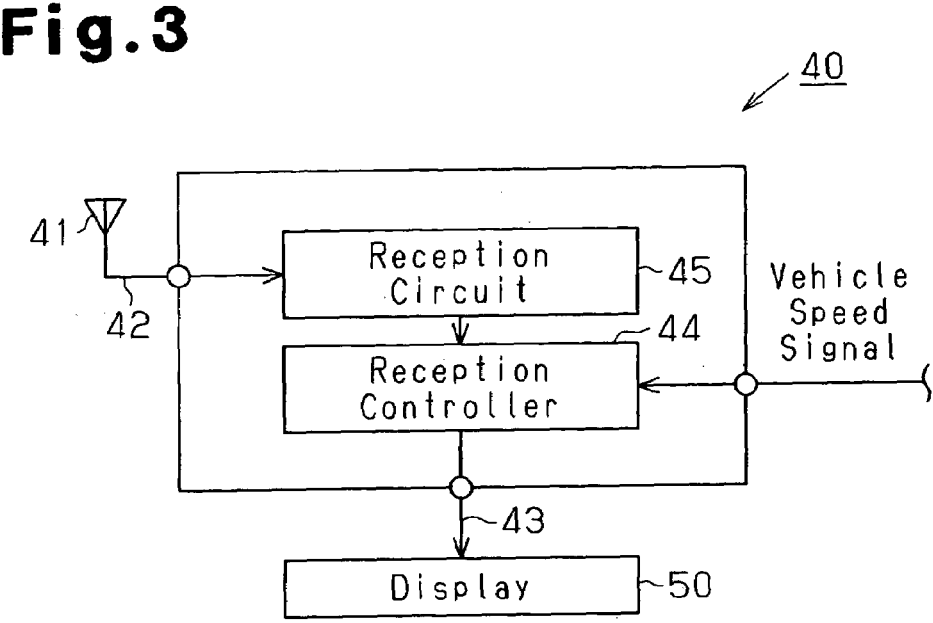
FIG. 3 is a block diagram showing a receiver.

As shown in FIG. 3, the receiver 40 includes a reception controller 44 and a reception circuit 45. The reception controller 44 processes data received with the reception antenna 41. The reception controller 44, which is, for example, a microcomputer, includes a CPU, a ROM, and a RAM. In an internal memory of the reception controller 44 such as, for example, ROM, there has been registered position information for localizing a position of the tire 20 in the vehicle 10 in advance. This position information is utilized in order to localize the position of the tire 20 in the vehicle 10. In addition, in the internal memory of the reception controller 44 such as, for example, in ROM, there has been stored a correction table for correcting air pressure data. In this case, the correction table is composed of speed of the vehicle 10 and a correction value corresponding to the speed.

The reception controller 44 receives a signal representing the speed of the vehicle 10, or a vehicle speed signal, from, for example, a speedometer (not shown) provided at a predetermined position in the vehicle 10.

Figure 5A:
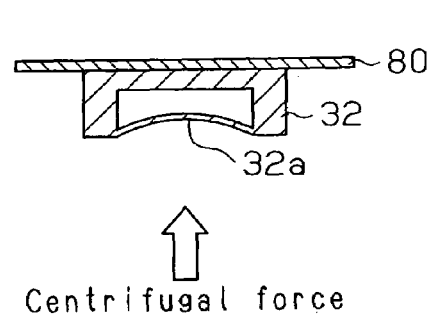
FIG. 5(a) is a schematic view representing the relationship between a diaphragm in the pressure sensor packaged on the lower surface of a substrate and centrifugal force.

The reception circuit 45 receives data from the transmitters 30 through the reception antenna 41. The reception circuit 45 demodulates and decodes the received data and sends the data to the reception controller 44. The reception controller 44 corrects the air pressure data contained in the received data. Specifically, it obtains a correction value from the correction table on the basis of the vehicle speed signal to add and deduct the correction value thus obtained and the air pressure data received. In other words, when centrifugal force is applied to the pressure sensor 32 packaged on the underside of the substrate 80 from the outside of the diaphragm 32a toward the inside thereof as shown in FIG. 5(a), measured air pressure is higher than actual air pressure. Therefore, a correction value obtained from the air pressure data received will be deducted.

Figure 5B:
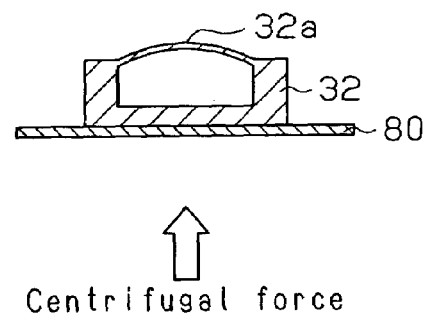
FIG. 5(b) is a schematic view representing the relationship between a diaphragm in the pressure sensor packaged on the upper surface of the substrate and the centrifugal force.
Figure 5C:
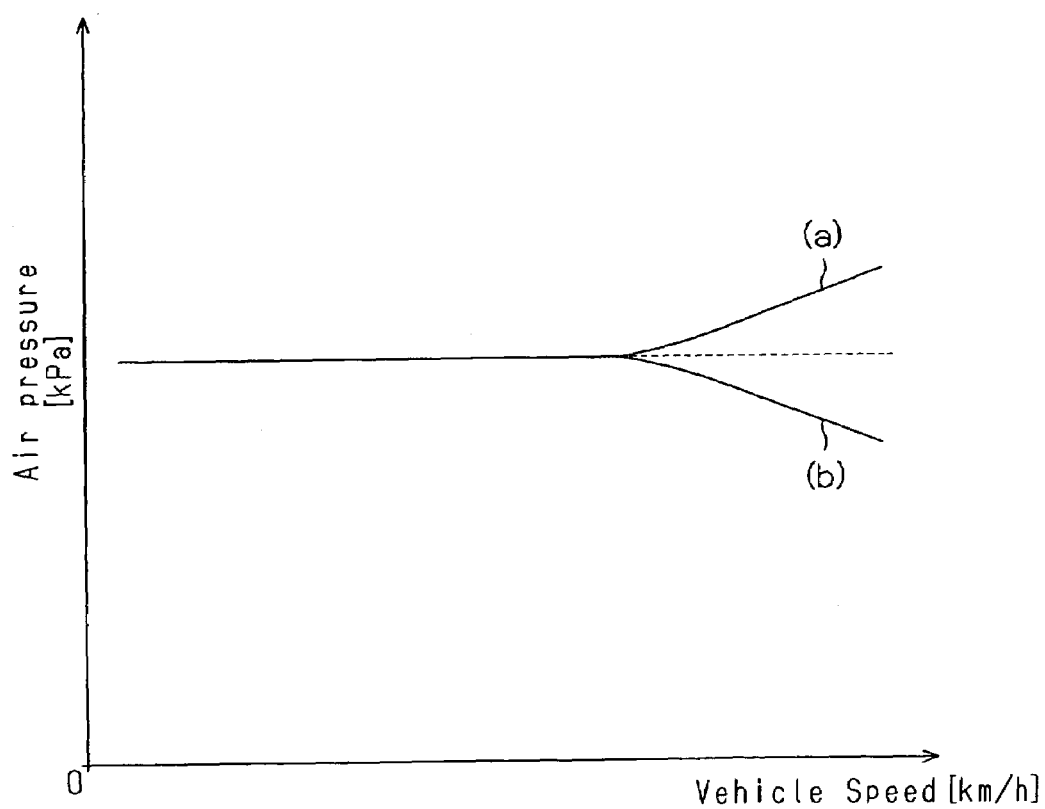
FIG. 5(c) is a graph representing the relationship between vehicle speed and air pressure measured by a pressure sensor.

On the other hand, when centrifugal force is applied to the pressure sensor 32 packaged on the upper surface of the substrate 80 from the inside of the diaphragm 32a toward the outside thereof as shown in FIG. 5(b), measured air pressure is lower than actual air pressure as shown in FIG. 5(c). Therefore, the correction value obtained will be added to the air pressure data received. For this reason, the reception controller 44 obtains corrected air pressure data, that is, accurate air pressure data. As a result, the reception controller 44 obtains the internal pressure and the temperature of the tire 20 that are associated with the transmitter 30 that is the source of the received data.

The reception controller 44 also causes the display 50 to show data regarding the air pressure and the temperature. Particularly, when there is an abnormality in the pressure of the tire 20, the controller 44 accordingly displays a warning on the display 50.

Also, on the basis of the data received at this time, the transmitter 30 which is the source of the outgoing data, designates the tire 20 to display on the display 50. The receiver 40 is activated when a key switch (not shown) of the vehicle 10 is turned on.

Since the structure is arranged such that the air pressure of the tire 20 is measured with the pressure sensor 32, a main cause of error in the measurement of the air pressure is not possible in any component other than the diaphragm 32a of the pressure sensor 32. In other words, when the speed of the vehicle 10 exceeds a predetermined speed, the centrifugal force generated as the tire 20 rotates causes the tire 20 to elongate outwardly. As a result, the air pressure within the tire 20 lowers. On the other hand, when the vehicle 10 is traveling, there occurs friction between the tire 20 and the road surface. This friction raises temperature within the tire 20. As a result, the air pressure within the tire 20 rises.

According to experimental data of the vehicle 10 in which the tire 20 was mounted to a 15-inch wheel 21, however, it has been confirmed that lowered air pressure due to elongation of the tire 20 is substantially the same as air pressure increase due to temperature rise in the tire 20. Therefore, in structure in which the direction of normal to the diaphragm 32a in the pressure sensor 32 is the same as the direction of centrifugal force generated as the tire 20 rotates, it can be said that the centrifugal force that is generated as the tire 20 rotates is the main cause of error in the measurement of the air pressure.

This embodiment has the following advantages.

(1) In the internal memory of the reception controller 44 such as, for example, ROM, there has been stored a correction table for correcting air pressure data. The reception controller 44 receives a signal representing the speed of the vehicle 10, or a vehicle speed signal, from, for example, a speedometer (not shown) provided at a predetermined position in the vehicle 10. The reception controller 44 obtains the correction value from the correction table on the basis of the vehicle speed signal to add and deduct the correction value obtained and the air pressure data received. For this reason, the reception controller 44 can obtain air pressure data corrected, that is, accurate air pressure data. Therefore, even in a case where the speed of the vehicle 10 exceeds the predetermined speed and the centrifugal force generated as the tire 20 rotates is applied to the diaphragm 32a of the pressure sensor 32, accurate air pressure data can be obtained. Accordingly, any measurement error due to the centrifugal force generated as the tire 20 rotates can be reduced.

(2) The timing of transmission of the transmitters 30 is regulated such that each transmitter 30 performs transmission at a timing different from those of the other transmitters 30. Therefore, two or more of the transmitters 30 do not perform transmission simultaneously. As a result, the reception controller 44 is capable of correcting air pressure data received in order. Therefore, even in a structure in which the air pressure data is corrected by the reception controller 44, there is no possibility of excessive load on the reception controller 44.

The above embodiment may be modified as follows.

In FIG. 2, as indicated by a two-dot chain line, the structure may be arranged such that an acceleration sensor 34 is provided in the transmitter 30 and in an internal memory of the transmission controller 31 such as, for example, a ROM, there is stored a correction table for correcting the air pressure data. Specifically, the acceleration sensor 34 outputs data (centrifugal force data) of the centrifugal force generated as the tire 20 rotates to the transmission controller 31. The transmission controller 31 corrects the air pressure data on the basis of the centrifugal force data from the acceleration sensor 34 before wirelessly transmitting the data. Since the air pressure data is corrected by the transmitter 30 if constructed as described above, the air pressure data after the correction will be wirelessly transmitted to the receiver 40. Therefore, the receiver 40 is capable of displaying the data thus received on the display 50 immediately.

To the structure in which the above-described acceleration sensor 34 is provided in the transmitter 30 and in the internal memory of the transmission controller 31 such as, for example, ROM, there is stored a correction table for correcting the air pressure data, the above-described embodiment may be applied. If constructed in this way, further accurate air pressure data will be able to be obtained.

Figure 4:
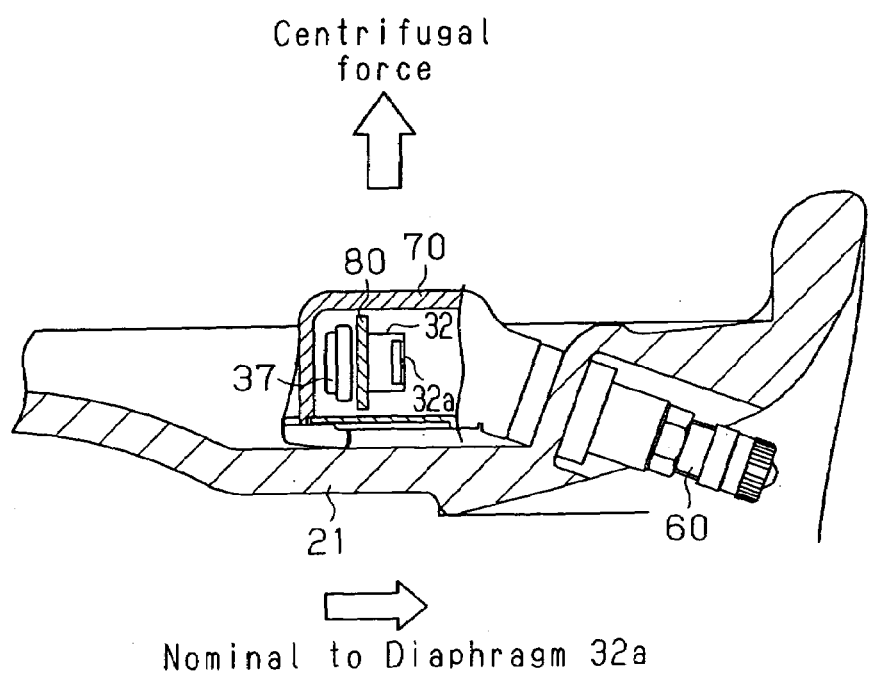
FIG. 4 is a cross-sectional view showing the transmitter attached to a wheel.

As shown in FIG. 4, the structure may be arranged such that the pressure sensor 32 is disposed in such a manner that the direction of normal to the diaphragm 32a in the pressure sensor 32 is orthogonal to the direction of centrifugal force that is generated as the tire 20 rotates. Specifically, in a valve stem 60 for filling the tire 20 with air, there has been disposed a casing 70 for housing the transmitter 30. Electronic components including the pressure sensor 32 are packaged on a substrate 80. Thus, within the casing 70, the substrate 80 is arranged in such a manner that the direction of normal to the diaphragm 32a in the pressure sensor 32 is orthogonal to the direction of centrifugal force that is generated as the tire 20 rotates. At this time, if on a back surface of the substrate 80 on which electronic components including the pressure sensor 32 have been packaged, there is arranged a battery 37, it is capable of contributing to miniaturization of the casing 70 because space savings for electronic components constituting the transmitter 30 can be performed. If constructed as described above, the diaphragm 32a will be restrained from deflecting inwardly or outwardly due to centrifugal force that is generated as the tire 20 rotates. As a result, error will be reduced in air pressure from the pressure sensor 32. Accordingly, it will be possible to reduce measurement error due to the centrifugal force that is generated as the tire 20 rotates. In this respect, there is also a possibility that a during sudden start or during an emergency stop of the vehicle 10, the diaphragm 32a of the pressure sensor 32 deflects outwardly or inwardly. For this reason, when the air pressure is measured during a sudden start or emergency stop of the vehicle 10, the diaphragm 32a of the pressure sensor 32 will be affected by the centrifugal force due to the sudden start or emergency stop of the vehicle 10. If the air pressure should be measured during a sudden start or emergency stop of the vehicle 10, a method of invalidating the air pressure data measured, or the like will be conceivable.

To the structure in which the pressure sensor 32 is disposed in such a manner that the direction of normal to the diaphragm 32a in the pressure sensor 32 is orthogonal to a direction of the centrifugal force that is generated as the tire 20 rotates, the above-described embodiment may be applied. If constructed in this way, further accurate air pressure data will be able to be obtained.

A correction expression for correcting the air pressure data is derived from the graph shown in FIG. 5(c) to cause the correction expression to be stored in the internal memory within the transmission controller 31 or the reception controller 44 such as, for example, a ROM. Thus, the structure may be arranged such that the air pressure data is corrected by the transmitter 30 or the receiver 40 on the basis of the correction expression.

Since distance between the center of the wheel 21 and a position whereat the transmitter 30 is installed changes in accordance with the size of the wheel 21, the magnitude of the centrifugal force applied to the diaphragm 32a of the pressure sensor 32 also differs. Therefore, in accordance with the size of the wheel 21 mounted to the vehicle 10, the value of the correction table and the coefficient of the correction expression are preferably changed. In this respect, in the case of a change of several inches (for example, when changed from a 15-inch wheel 21 to a 17-inch wheel 21), it has been confirmed by experiment that it is within tolerance.

Other than four-wheeled vehicles, the present invention may be applied to two-wheeled vehicles, such as bicycles and motor cycles, multi-wheeled busses, multi-wheeled trailers and industrial vehicles, such as forklifts. When the present invention is applied to a trailer, the receiver 40 and the display 50 are provided in the tractor.

The invention claimed is:

1. A tire condition monitoring apparatus for use in a tire of a vehicle, the tire condition monitoring apparatus comprising: a transmitter provided in the tire of the vehicle and having a sensor for measuring a condition of the tire, wherein the transmitter wirelessly transmits data representing the condition of the tire measured by the sensor, wherein the sensor is provided such that the direction of normal to a measurement surface in the sensor is orthogonal to the direction of centrifugal force generated when the tire rotates.

2. The tire condition monitoring apparatus according to claim 1, further comprising a receiver for receiving and processing data wirelessly transmitted from the transmitter.

3. A tire condition monitoring apparatus for use with a tire of a vehicle, the tire condition monitoring apparatus comprising: a transmitter for wirelessly transmitting data representing a condition of the tire of the vehicle; a reception antenna provided in the vehicle for receiving the data from the transmitter; a receiver for processing the data received by the reception antenna; and reception correcting means for receiving a signal representing speed of the vehicle and correcting the received data on the basis of the signal representing the vehicle speed.

4. The tire condition monitoring apparatus according to claim 3, further comprising measuring means provided in the tire of the vehicle for measuring the condition of the tire.

\* \* \* \* \*